US012811234B2

(12) United States Patent
Kang et al.

(10) Patent No.: US 12,811,234 B2
(45) Date of Patent: Nov. 24, 2026

(54) BATTERY PACK

(71) Applicant: SK ON CO., LTD., Seoul (KR)

(72) Inventors: Min Song Kang, Daejeon (KR); Ji Woong Kim, Daejeon (KR); Byeong Jun Pak, Daejeon (KR); Ju Yong Park, Daejeon (KR); Suk Ho Shin, Daejeon (KR); Jin Su Han, Daejeon (KR)

(73) Assignee: SK On Co., Ltd., Seoul (KR)

(*) Notice: Subject to any disclaimer, the term of this patent is extended or adjusted under 35 U.S.C. 154(b) by 0 days.

(21) Appl. No.: 18/480,761

(22) Filed: Oct. 4, 2023

(65) Prior Publication Data

US 2024/0154231 A1 May 9, 2024

(30) Foreign Application Priority Data

Nov. 9, 2022 (KR) ........................ 10-2022-0148936

(51) Int. Cl.

| | |
|---|---|
| ***H01M 50/262*** | (2021.01) |
| ***H01M 50/211*** | (2021.01) |
| ***H01M 50/242*** | (2021.01) |
| ***H01M 50/258*** | (2021.01) |
| ***H01M 50/271*** | (2021.01) |
| ***H01M 50/502*** | (2021.01) |

(52) U.S. Cl.

CPC ....... *H01M 50/262* (2021.01); *H01M 50/211* (2021.01); *H01M 50/242* (2021.01); *H01M 50/258* (2021.01); *H01M 50/271* (2021.01); *H01M 50/502* (2021.01)

(58) Field of Classification Search

CPC ............. H01M 50/262; H01M 50/502; H01M 50/242; H01M 50/211; H01M 50/258; H01M 50/271

See application file for complete search history.

(56) References Cited

U.S. PATENT DOCUMENTS

| | | | | |
|---|---|---|---|---|
| 2017/0214012 A1* | 7/2017 | Benedict | ........... | H01M 10/0481 |
| 2019/0157639 A1* | 5/2019 | Smith | ................. | H01M 50/244 |
| 2022/0021060 A1* | 1/2022 | Yoo | ................... | H01M 10/6556 |
| 2022/0037726 A1 | 2/2022 | Choi et al. | | |

(Continued)

FOREIGN PATENT DOCUMENTS

| | | | | |
|---|---|---|---|---|
| CN | 215816196 U * | 2/2022 | ............. | Y02E 60/10 |
| KR | 10-2021-0041284 A | 4/2021 | | |

(Continued)

OTHER PUBLICATIONS

KIPO, Appl. 10-2022-0148936, Office Action, Sep. 3, 2026.

*Primary Examiner* — Nicole M. Buie-Hatcher
*Assistant Examiner* — Taylor Harrison Krone
(74) *Attorney, Agent, or Firm* — Jones Day

(57) ABSTRACT

A battery pack includes a plurality of battery modules, each battery module including: a cell stack that includes a plurality of battery cells arranged in a first direction; and a side cover disposed on at least one side of the cell stack; and a pack housing structured to accommodate the plurality of battery modules, wherein the side cover includes a body disposed at a side of the cell stack in the first direction; a first extension portion extending from the body in the first direction; and a second extension portion connected to the body and the first extension portion.

9 Claims, 7 Drawing Sheets

(56) References Cited

U.S. PATENT DOCUMENTS

| | | | | |
|---|---|---|---|---|
| 2022/0131119 | A1* | 4/2022 | Popovski | H01M 50/244 |
| 2022/0181733 | A1 | 6/2022 | Choi et al. | |
| 2022/0393293 | A1* | 12/2022 | Park | H01M 50/242 |
| 2023/0041000 | A1* | 2/2023 | Tandon | B60L 50/66 |
| 2023/0395926 | A1* | 12/2023 | Zhang | H01M 50/209 |

FOREIGN PATENT DOCUMENTS

| | | | | | |
|---|---|---|---|---|---|
| KR | 10-2022-0004378 | A | | 1/2022 | |
| KR | 10-2022-0014027 | A | | 2/2022 | |
| KR | 20220126132 | A | * | 9/2022 | H01M 50/249 |

* cited by examiner

I-I'

A

BATTERY PACK

CROSS-REFERENCE TO RELATED APPLICATION

This patent document claims the priority and benefits of Korean Patent Application No. 10-2022-0148936 filed on Nov. 9, 2022, the disclosure of which is incorporated herein by reference in its entirety.

TECHNICAL FIELD

The technology and implementations disclosed in this patent document generally relate to a battery pack.

BACKGROUND

Different from primary batteries, secondary batteries include battery cell that can be easily charged and discharged and are used as a power source for various mobile devices and electric vehicles. A battery module may contain a plurality of battery cells connected to each other, and a battery pack may be configured as a high-capacity energy storage device by connecting a plurality of battery modules and/or battery cells to each other.

SUMMARY

The disclosed technology may be implemented in some embodiments to provide a battery module and a battery pack that can sufficiently absorb expansion pressure of battery cells while having a simplified structure.

In addition, the disclosed technology may be implemented in some embodiments to provide a battery pack having a structure in which a battery module and a pack housing may be firmly coupled to each other.

Furthermore, the disclosed technology may be implemented in some embodiments to provide a battery module and a battery pack having high energy density, heat dissipation efficiency, and strong resistance against swelling of a battery cell.

In some embodiments of the disclosed technology, a battery pack includes a plurality of battery modules, each battery module including a cell stack that includes a plurality of battery cells arranged in a first direction and a side cover disposed on at least one side of the cell stack; and a pack housing structured to accommodate the plurality of battery modules, wherein the side cover in each battery module includes a body facing or opposing the cell stack in the first direction; a first extension portion extending from the body in the first direction; and a second extension portion connected to the body and the first extension portion.

The second extension portion may have an inclined surface with respect to the body or the first extension portion.

A spacing may be formed between the second extension portion and the body.

The pack housing may include a lower frame structured to support the plurality of battery modules—; and an upper frame covering an upper portion of the plurality of battery modules, and wherein the spacing between the second extension portion and the body tapers in a direction from the lower frame toward the upper frame.

The battery module may further include a busbar electrically connected to the plurality of battery cells in the cell stack; and an end cover facing or opposing the busbar in a second direction perpendicular to the first direction.

The side cover may be coupled to the end cover.

The pack housing may include a cross frame facing or opposing the side cover of the plurality of battery modules.

The side cover may be coupled to the cross frame.

The body may face or oppose the cross frame in the first direction, and the first extension portion may face or oppose the cross frame in a third direction perpendicular to the first direction.

The battery pack may further include a fastening member penetrating through the first extension portion and fastened to the cross frame.

The second extension portion may face or oppose a first avoidance portion through which the fastening member penetrates.

The pack housing may further include an upper frame covering an upper portion of the plurality of battery modules; and a coupling portion disposed on the cross frame and coupled to the upper frame.

The second extension portion may face or oppose a second avoidance portion through which the coupling portion penetrates.

The first extension portion may face or oppose a third avoidance portion through which the coupling portion penetrates, and the third avoidance portion and the second avoidance portion may overlap each other in the third direction.

The cell stack may face or oppose the upper frame and the lower frame in a state in which upper and lower portions of the plurality of battery cells are exposed.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
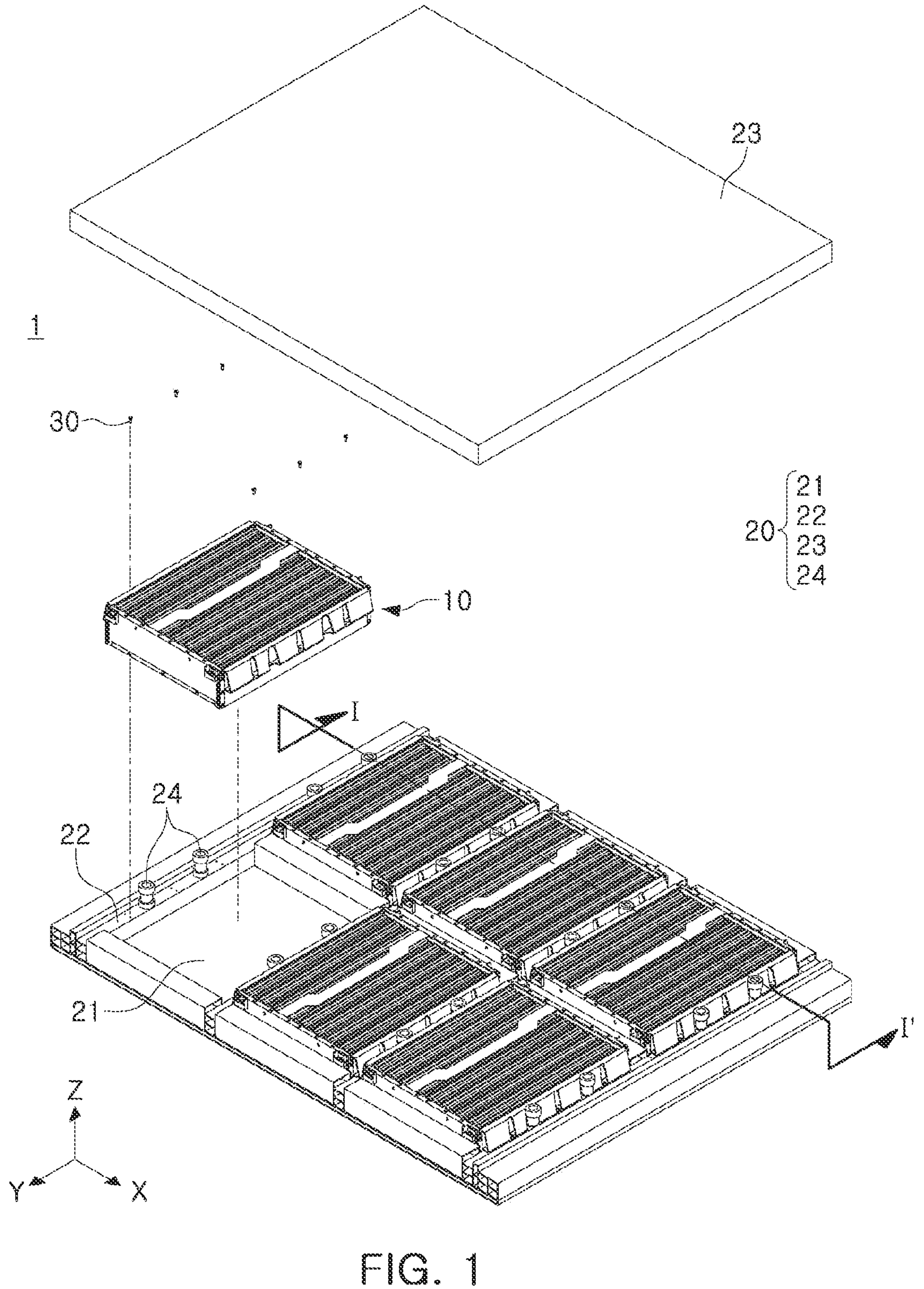
FIG. 1 is an exploded perspective diagram illustrating a battery pack based on an embodiment of disclosed technology.

Features of the disclosed technology disclosed in this patent document are illustrated in embodiments with reference to the accompanying drawings.

In the drawings, same elements will be indicated by same reference numerals. For ease of description, the same reference numerals may be used in different embodiments. That is, even when components having the same reference numerals are illustrated in a plurality of drawings, the plurality of drawings do not all refer to the same embodiment.

An expression used in the singular encompasses the expression of the plural, unless it has a clearly different meaning in the context. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the descriptions below, the terms such as an upper side, an upper portion, a lower side, a lower portion, a side surface, a front surface, a rear surface, and the like, may be denoted with respect to the directions indicated in the drawings, and may be represented differently when the direction of the component changes.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right in the embodiments.

The redundant descriptions and detailed descriptions of known functions and elements which may unnecessarily make the gist of the present disclosure obscure will be omitted. In the accompanying drawings, some elements may be exaggerated, omitted or briefly illustrated, and the sizes of the elements do not necessarily reflect the actual sizes of these elements.

The use of a secondary battery involves repeatedly charging and discharging the secondary battery and may cause a gas to be generated in the secondary battery, which may cause the secondary battery to expand or to disform (e.g., in a width direction). In a battery module and a battery pack including a plurality of secondary battery cells, a deformation of secondary battery cells (e.g., in the width direction) may degrade the electrical performance of the battery module or the battery pack and may deteriorate the exterior of the battery module.

With the gradual increase in the energy capacity required for a battery module and a battery pack, new battery module and battery pack structures have become essential to efficiently manufacture a high-capacity battery module and to increase the energy density of battery modules.

The disclosed technology can be implemented in some embodiments to provide a battery module and a battery pack that have a simplified structure and are able to sufficiently absorb expansion pressure of battery cells.

Figure 2:
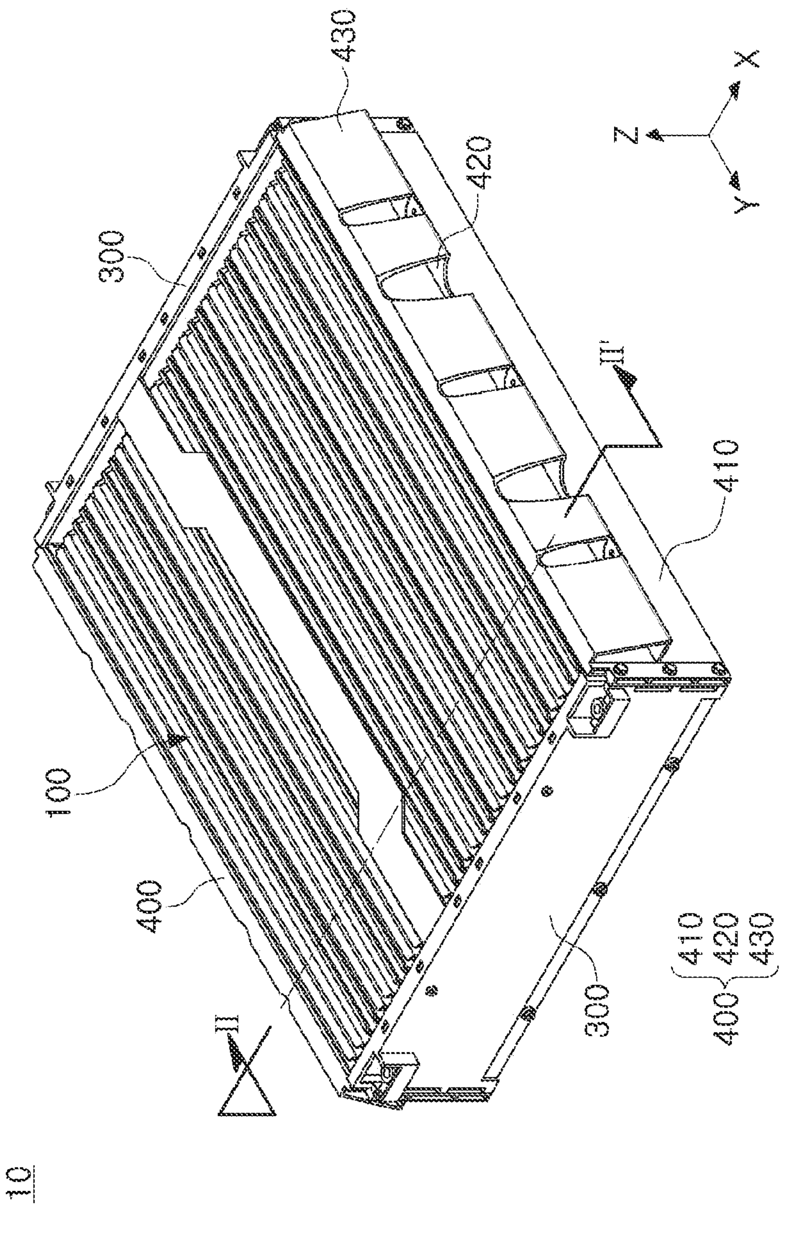
FIG. 2 is a perspective diagram illustrating a battery module included in a battery pack based on an embodiment of disclosed technology.
Figure 3:
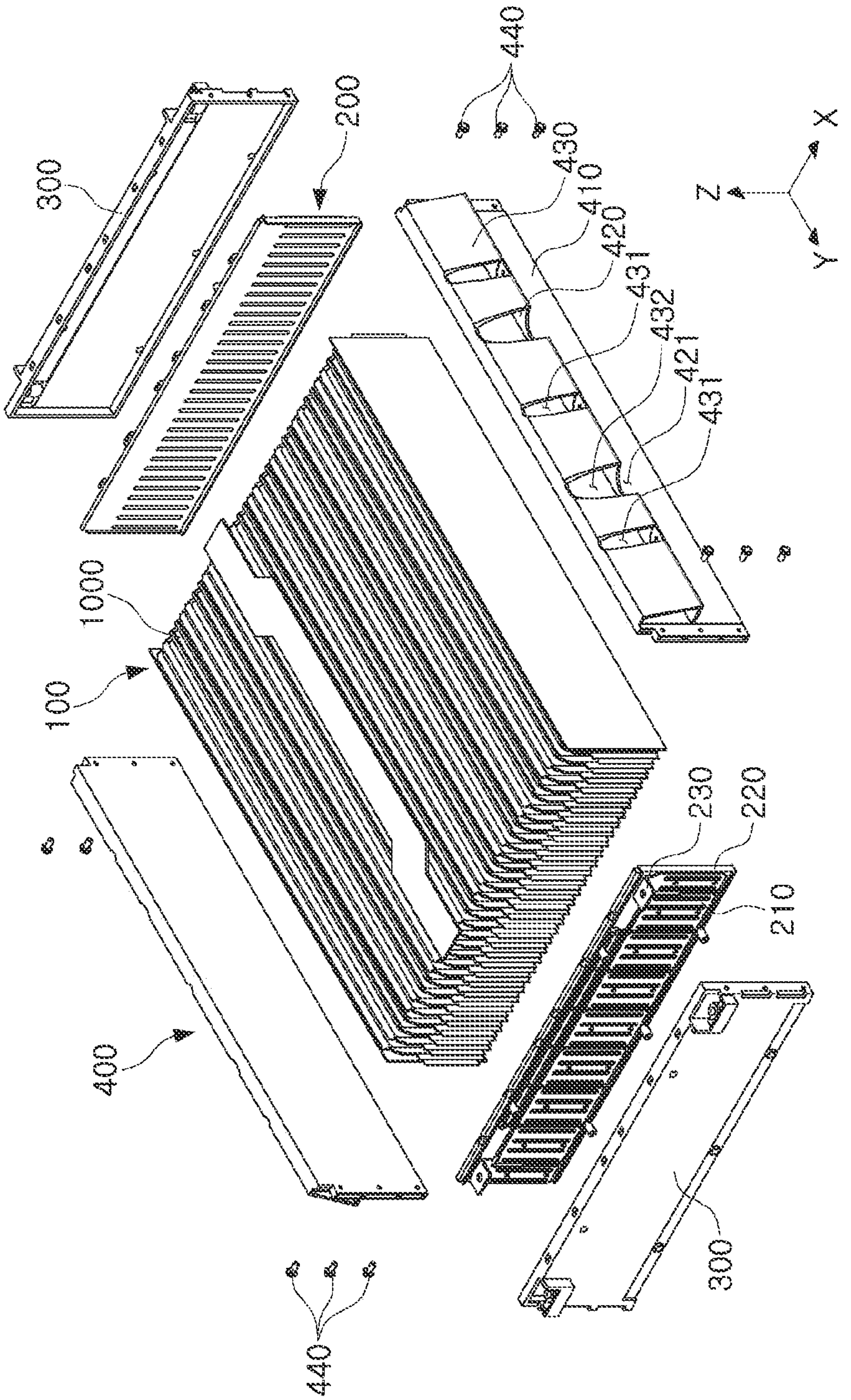
FIG. 3 is an exploded perspective diagram illustrating a battery module based on an embodiment of disclosed technology.
Figure 4:
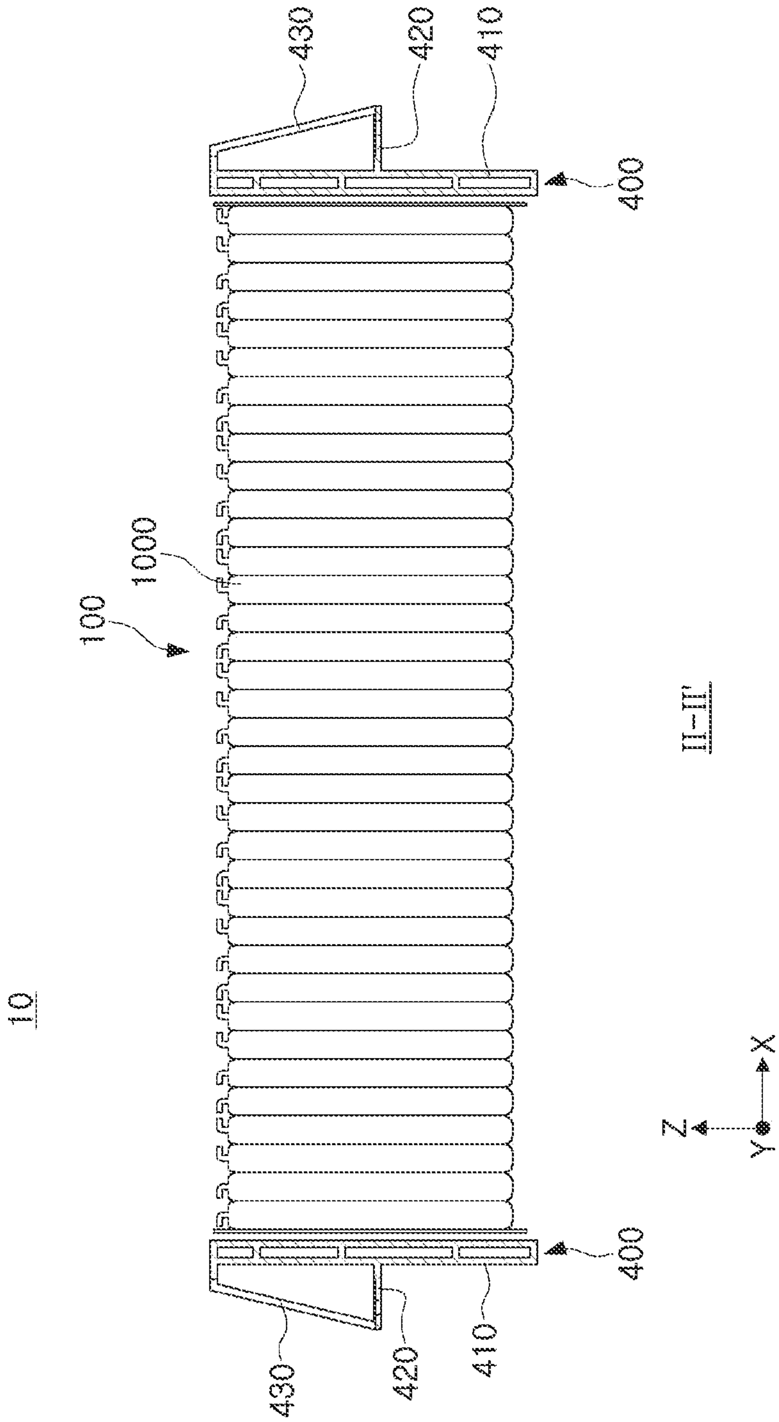
FIG. 4 is a cross-sectional diagram taken along line II-II' in FIG. 2.

FIG. 1 is an exploded perspective diagram illustrating a battery pack based on an embodiment. FIG. 2 is a perspective diagram illustrating a battery module included in a battery pack based on an embodiment. FIG. 3 is an exploded perspective diagram illustrating a battery module based on an embodiment.

The battery pack 1 may include a plurality of battery modules 10 and a pack housing 20 having a space in which the plurality of battery modules 10 are accommodated.

Each of the plurality of battery modules 10 may include one or more battery cells 1000 and may be configured to output or store electrical energy. Each battery cell 1000 may be a rechargeable lithium ion battery cell or a rechargeable battery cell based on other battery materials.

In the battery module 10, a plurality of battery cells 1000 may be stacked with each other and may form at least a portion of the cell stack 100. The battery module 10 may further include a busbar assembly 200 electrically connected to the battery cells 1000 of the cell stack 100 and an end cover 300 covering the busbar assembly 200.

The cell stack 100 may include a plurality of battery cells 1000 electrically connected to each other. In the cell stack 100, the plurality of battery cells 1000 may be stacked in one direction (e.g., X-axis direction). As will be discussed below, the stacking direction of the battery cells 1000 included in the cell stack 100 may be referred to as a "first direction" or a "cell stacking direction."

The battery cell 1000 may be configured as a pouch-type secondary battery having a structure in which an electrode assembly (not illustrated) is stored in a pouch. In a pouch-type secondary battery, an electrode assembly (not illustrated) and an electrolyte solution (not illustrated) may be accommodated in a pouch formed by forming a sheet or a plurality of exterior materials.

However, the battery cell 1000 is not limited to a pouch-type secondary battery. For example, the battery cell 1000 may be configured as a prismatic can-type secondary battery, or a plurality of pouch-type secondary batteries may be grouped into bundles therein.

The battery module 10 may include a busbar assembly 200 electrically connected to the battery cells 1000 of the cell stack 100.

The busbar assembly 200 may be disposed on at least one side of the cell stack 100 and may electrically connect the battery cells 1000 to each other. A pair of busbar assemblies 200 may be disposed on both ends of the cell stack 100, respectively. However, a pair of busbar assemblies 200 may be connected to each other and may form a single component.

The busbar assembly 200 may include a plurality of busbars 210 electrically connecting the battery cells 1000 of the cell stack 100 to each other and a busbar frame 220 supporting the busbars 210.

The busbar 210 may be formed of a conductive material and may be configured to electrically connect the plurality of battery cells 1000 to each other. The busbar 210 may be electrically connected to the battery cell 1000 while being fixed to the busbar frame 220. A terminal portion 230 which may be electrically connected to an external circuit of the battery module 10 may be disposed on at least a portion of the busbar 210.

The busbar frame 220 may support the busbar 210 to be stably connected to the battery cell 1000. The busbar frame 220 may include a non-conductive material (e.g., plastic) having a predetermined stiffness and may structurally support the plurality of busbars 210.

The busbar frame 220 may face or oppose at least one side of the cell stack 100. For example, referring to FIG. 3, the busbar frame 220 may be disposed to face or oppose the cell stack 100 in the second direction (e.g., Y-axis direction). Here, the second direction (Y-axis direction) may be a direction perpendicular to the first direction (X-axis direction). In the description as below, the second direction (Y-axis direction) may refer to a direction parallel to a direction in which the busbar assembly 200 and the cell stack 100 oppose each other.

An end cover 300 may be disposed on the outermost side of the battery module 10. The end cover 300 may protect the cell stack 100 from external impacts by including a material having rigidity (e.g., a metal such as aluminum or a resin compound).

The end cover 300 may be coupled to the busbar assembly 200 or the cell stack 100 and may cover the busbar 210. Although not illustrated in the drawings, in some implementations, an insulating cover (not illustrated) including an insulating material may be disposed between the end cover

300 and the busbar assembly 200 to prevent an electrical short between the end cover 300 and the busbar 210.

The battery module 10 may include a side cover 400 opposing at least one side of the cell stack 100. The side cover 400 may protect the cell stack 100 from external impacts by including a material having rigidity (e.g., a metal such as aluminum or a resin compound).

The side covers 400 may be provided as a pair to cover different sides of the cell stack 100. A pair of the side covers 400 may be coupled to the end cover 300, may form a side surface of the battery module 10, and may protect the cell stack 100 from the external environment.

The side cover 400 may face or oppose the cell stack 100 in a different direction from the end cover 300. For example, as illustrated in FIG. 3, the side cover 400 may be disposed to face or oppose the cell stack 100 in the first direction (X-axis direction), and the end cover 300 may be disposed to face or oppose the cell stack 100 in the second direction (Y-axis direction) with the busbar assembly 200 interposed therebetween. Accordingly, a pair of end covers 300 and a pair of side covers 400 may form four sides of the battery module 10.

Both ends of the side cover 400 may be coupled to the end cover 300. A fastening member 440 may be used for coupling between the side cover 400 and the end cover 300. For example, a plurality of fastening members 440 may penetrate through the side cover 400 and may be fastened to the end cover 300, and accordingly, the side cover 400 and the end cover 300 may be fixed to each other. However, the method of coupling the side cover 400 to the end cover 300 is not limited to the aforementioned example. For example, the side cover 400 may be welded and coupled to the end cover 300.

The side cover 400 may face or oppose the battery cell 1000 in the first direction (X-axis direction), which is the stacking direction of the battery cell 1000, and accordingly, the side cover 400 may be configured to provide surface pressure to the battery cell 1000.

For example, when the battery cell 1000 is repeatedly charged and discharged, swelling of the battery cell 1000 may occur due to gas generated in the battery cell 1000, such that electrical performance of the battery cell 1000 may deteriorate. To prevent such swelling, the side cover 400 may be configured to withstand expansion pressure caused by swelling of the battery cell 1000. That is, the side cover 400 may be disposed to face or oppose the cell stack 100 in the first direction (X-axis direction), and may provide surface pressure in the first direction (X-axis direction) acting against expansion pressure in the first direction (X-axis direction) generated in the battery cell 1000.

To have stronger resistance against the expansion pressure of the battery cell 1000, the side cover 400 may include reinforcing structures 420 and 430.

Referring to FIGS. 2 and 3, the side cover 400 may include a body 410 facing or opposing the cell stack 100 and reinforcing structures 420 and 430 connected to the body 410 and further increasing structural rigidity of the side cover 400.

One surface of the body 410 may face or oppose the cell stack 100 in a first direction (X-axis direction). The reinforcing structures 420 and 430 may be disposed on the other surface opposite to one surface of the body 410. For example, the reinforcing structures 420 and 430 may include a first extension portion 420 extending in a first direction (X-axis direction) from the body 410 and a second extension portion 430 extending in a direction different from the extension direction of the first extension portion 420.

The first extension portion 420 may have a structure protruding outwardly from the battery module 10 on the body 410. For example, the first extension portion 420 may be configured to protrude in the first direction (X-axis direction), and accordingly, the first extension portion 420 may have a structure perpendicular to the body 410.

As the first extension portion 420 is disposed, the side cover 400 may have structural rigidity greater than simply having a plate shape.

The side cover 400 may further include a second extension portion 430 connected to the first extension portion 420. The second extension portion 430 may be connected to an end of the first extension portion 420 and may be configured to extend in a direction different from the extension direction of the first extension portion 420. For example, the second extension portion 430 may be configured to extend in an inclined direction with respect to the extension direction (e.g., the first direction) of the first extension portion 420.

The second extension portion 430 may be connected to both the first extension portion 420 and the body 410. For example, the second extension portion 430 may be a structure connecting an end of the first extension portion 420 in an X-axis direction to an end of the body 410.

The second extension portion 430 may have an inclined surface with respect to the first extension portion 420 or the body 410. For example, the second extension portion 430 may have an inclined surface obliquely extending from an end of the first extension portion 420 to the end of the body 410. In this case, a spacing may be formed between the second extension portion 430 and the body 410.

A distance between the second extension portion 430 and the body 410 may be configured to gradually decrease in a third direction (e.g., a Z-axis direction) which is the height direction of the battery module 10. For example, the spacing between the second extension portion 430 and the body 410 tapers in a direction from the lower frame 21 toward the upper frame 23. In the description below, the third direction (Z-axis direction) may be a height direction of the battery module 10, and may refer to a direction perpendicular to both the first direction (an X-axis direction) and the second direction (a Y-axis direction).

A cross-section of the side cover 400 may have a triangular or trapezoidal shape surrounded by the body 410, the first extension portion 420 and the second extension portion 430. Due to the structure formed by the first extension portion 420 and the second extension portion 430, the side cover 400 may effectively withstand expansion pressure of the battery cell 1000.

An upper surface or a lower surface of the battery module 10 may be configured such that the cell stack 100 may be exposed. For example, the battery module 10 may have a structure in which the cell stack 100 is disposed in a rectangular frame formed by coupling the end cover 300 and the side cover 400 to each other, and may not have a cover member covering upper or lower surfaces of the cell stack 100. By this structure, the cell stack 100 may be exposed to and directly face or oppose external components of the battery module 10 (e.g., the lower frame 21, the upper frame 23 or the heat dissipation member (not illustrated) of the battery pack 1 illustrated in FIG. 1) or may be in direct contact with the external components. Accordingly, heat dissipation from the cell stack 100 in an upward direction or a downward direction of the battery module 10 may be smoothly performed, and accordingly, heat dissipation efficiency of the battery module 10 may increase.

The plurality of battery modules 10 may be accommodated in the pack housing 20. The pack housing 20 may include a lower frame 21 in which the battery module 10 is disposed, a plurality of cross frames 22 disposed above the lower frame 21, and an upper frame 23 covering an upper portion of the battery module 10.

The lower frame 21 may form a lower surface of the pack housing 20. The lower frame 21 may be provided as a rectangular plate-shaped member or a polygonal plate-shaped member, but the specific shape thereof is not limited thereto.

The plurality of battery module 10 may be disposed on the lower frame 21. For example, the plurality of battery module 10 may be arranged in the first direction (X-axis direction) or the second direction (Y-axis direction) on the lower frame 21.

The lower frame 21 may be formed of a metal material having rigidity. For example, at least a portion of the lower frame 21 may include aluminum. When the lower frame 21 may include aluminum, the heat energy generated in the battery module 10 may be swiftly dissipated externally of the battery pack 1 due to excellent thermal conductivity of aluminum.

A heat dissipation member (not illustrated) may be disposed between the lower frame 21 and the battery module 10. The heat dissipation member (not illustrated) may be disposed such that one surface may be in contact with the cell stack 100 of the battery module 10 and the other surface opposite to the one surface may be in contact with the lower frame 21. A heat dissipation member (not illustrated) may be provided as a thermal adhesive. The heat dissipation member (not illustrated) may fill a space between the battery module 10 and the lower frame 21 such that heat transfer by conduction may be actively performed. Accordingly, heat dissipation efficiency of the battery pack 1 may increase.

The cross frame 22 may be connected to the lower frame 21. For example, the cross frame 22 may be disposed to intersect an upper surface of the lower frame 21 in the first direction (X-axis direction) or the second direction (Y-axis direction).

The cross frame 22 may be disposed to partition an internal space of the pack housing 20. For example, a plurality of cross frames 22 may be spaced apart from each other in the first direction (X-axis direction) on the upper surface of the lower frame 21, and one or more battery modules 10 may be disposed between two neighboring cross frames 22.

At least a portion of the plurality of cross frames 22 may be disposed between the battery modules 10. For example, the cross frame 22 may be disposed between the plurality of battery modules 10 disposed in the first direction (X-axis direction).

Similarly to the lower frame 21, the cross frame 22 may be formed of a metal material having a predetermined degree of stiffness. For example, at least a portion of the cross frame 22 may be formed of aluminum for a high heat dissipation effect.

The pack housing 20 may include an upper frame 23 disposed above the battery module 10 and may close an internal space of the pack housing 20.

The upper frame 23 may be fixed to the cross frame 22. For example, a coupling portion 24 extending in a third direction (Z-axis direction), which is the height direction of the battery pack 1, and the upper frame 23 may be coupled to the coupling portion 24 and may cover the upper portion of the battery module 10.

Referring to FIG. 1, the coupling portion 24 may have a pillar shape extending in a third direction (Z-axis direction) from the cross frame 22, but the specific arrangement position and the shape thereof are not limited thereto.

The upper frame 23 may be coupled to the coupling portion 24 of the cross frame 22 through a fastening member (not illustrated). For example, a fastening member (not illustrated) may be coupled to the coupling portion 24 by penetrating through the upper frame 23 in the third direction (Z-axis direction), and accordingly, the upper frame 23 may be fixed to the cross frame 22 and may cover the internal space of battery pack 1.

When the battery module 10 is disposed in the pack housing 20, the side cover 400 of the battery module 10 may be used as a coupling structure. For example, the side cover 400 may be coupled to the cross frame 22 of the pack housing 20, and accordingly, the battery module 10 may be firmly fixed in the pack housing 20.

The side cover 400 and the cross frame 22 may be coupled to each other through the fastening member 30.

The fastening member 30 may penetrate through at least a portion of the side cover 400 and may be fastened to the cross frame 22. For example, the plurality of fastening members 30 may penetrate through the first extension portion 420 of the side cover 400 in a third direction (Z-axis direction) and may be fastened to the cross frame 22.

In this case, the second extension portion 430 may include a first avoidance portion 431 for avoiding interference with the fastening member 30. For example, the first avoidance portion 431 may have a groove structure formed on an inclined surface of the second extension portion 430, and the fastening member 30 may penetrate through the first avoidance portion 431 and may be inserted into the first extension portion 420 in a third direction (Z-axis direction).

A plurality of fastening members 30 may be provided in the second direction (Y-axis direction), and a plurality of the first avoidance portion 431 of the second extension portion 430 may also be disposed in the second direction (Y-axis direction).

When the coupling portion 24 is disposed on the cross frame 22, the second extension portion 430 may further include a second avoidance portion 432 for avoiding interference with the coupling portion 24. For example, the second avoidance portion 432 may have a groove structure formed on an inclined surface of the second extension portion 430, and the coupling portion 24 of the cross frame 22 may penetrate through the second avoidance portion 432 and may be coupled to the upper frame 23.

Also, the first extension portion 420 may also include an avoidance structure for avoiding interference with the coupling portion 24 of the cross frame 22. For example, the first extension portion 420 may have a third avoidance portion 421 for avoiding the coupling portion 24. The third avoidance portion 421 may overlap the second avoidance portion 432 of the second extension portion 430 in the third direction (Z-axis direction). By this avoidance structure, in the process of assembling the battery module 10 to the pack housing 20, the side cover 400 may be prevented from colliding with or interfering with the coupling portion 24. Also, the plurality of battery modules 10 may be disposed in close contact with each other, and the rigid structures of the pack housing 20 may be firmly connected to each other, such that the battery pack 1 having relatively high energy density and relatively high structural stability may be implemented.

However, the method of coupling the side cover 400 to the cross frame 22 is not limited to the aforementioned example. For example, without a fastening member 30, the side cover 400 may be configured to be inserted and coupled to the cross frame 22. Alternatively, the side cover 400 and the cross frame 22 may be welded and coupled to each other.

As the side cover 400 and the cross frame 22 are coupled to each other, the side cover 400 may effectively withstand expansion pressure caused by swelling of the battery cell 1000. That is, since the cross frame 22 is firmly fixed to the side cover 400 and may support the side cover 400 in the first direction (X-axis direction), the side cover 400 may stably withstand expansion pressure of the battery cell 1000.

Figure 6:
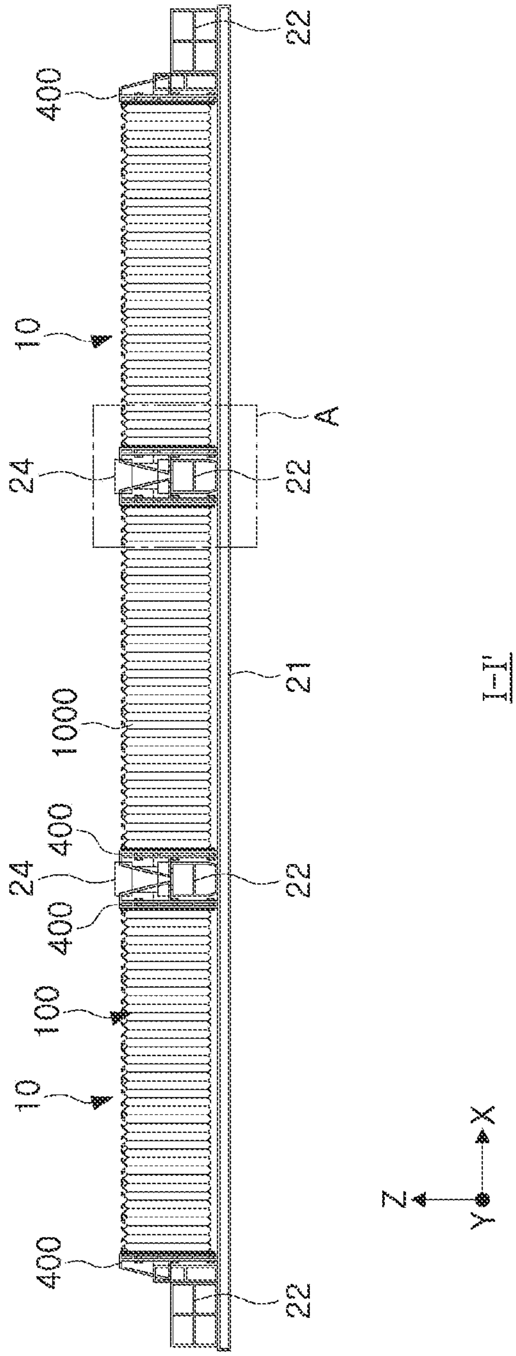
FIG. 6 is a cross-sectional diagram taken along line I-I' in FIG. 1.
Figure 7:
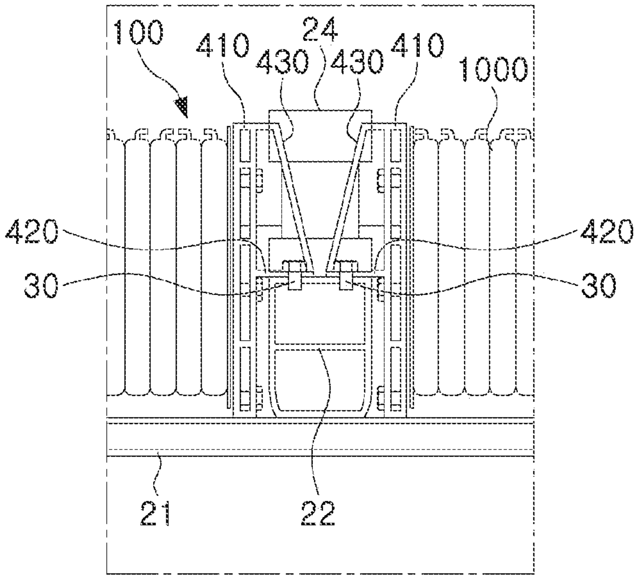
FIG. 7 is an enlarged diagram illustrating portion A in FIG. 6.

Hereinafter, a coupling structure between the battery module 10 and the pack housing 20 of the battery pack 1 will be described with reference to FIGS. 5 to 7.

Figure 5:
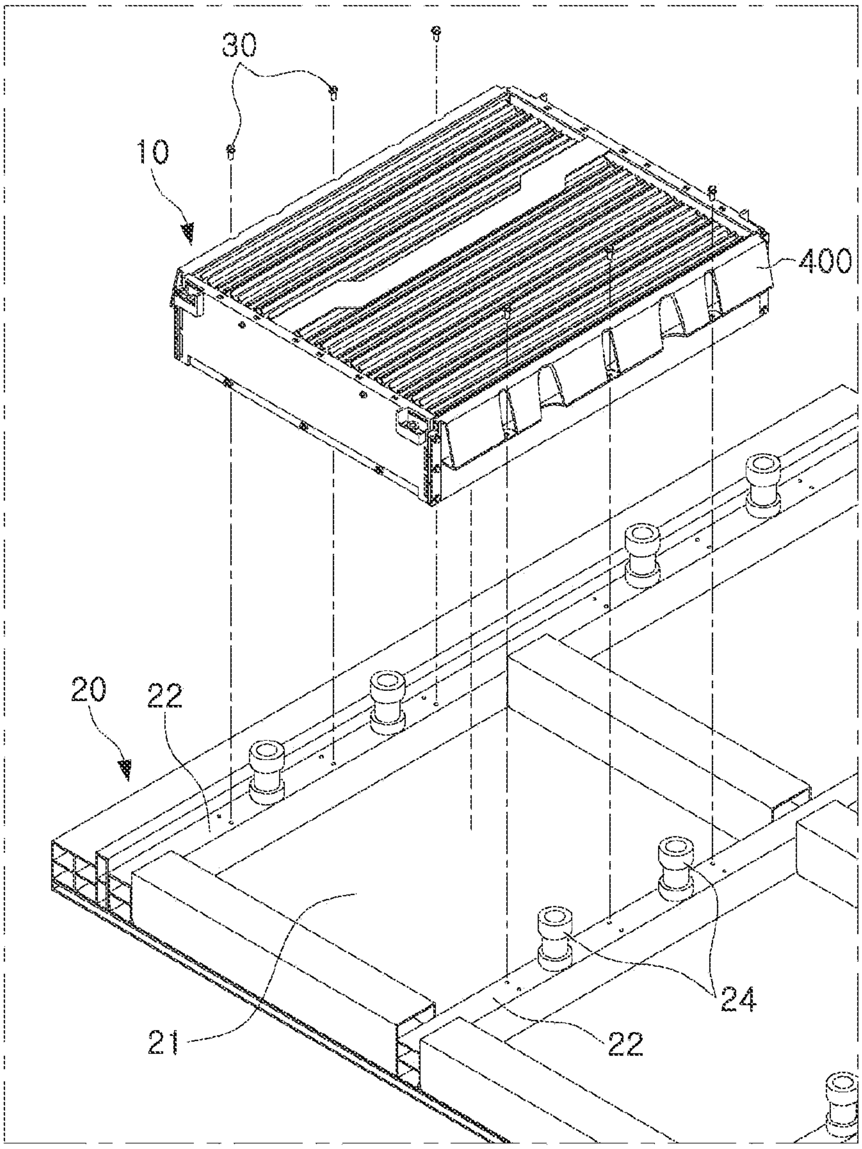
FIG. 5 is a diagram illustrating coupling between a battery module and a pack housing based on an embodiment of disclosed technology.

FIG. 5 is a diagram illustrating coupling between a battery module and a pack housing based on an embodiment. FIG. 6 is a cross-sectional diagram taken along line I-I' in FIG. 1. FIG. 7 is an enlarged diagram illustrating portion A in FIG. 6.

The battery module 10 may be disposed on the lower frame 21 of the pack housing 20, and the side cover 400 of the battery module 10 and the cross frame 22 of the pack housing 20 may be coupled to each other.

The plurality of cross frames 22 may be spaced apart from each other in the first direction (X-axis direction) along an upper surface of the lower frame 21. The battery module 10 may be disposed between cross frames 22.

At least one of the plurality of cross frames 22 may have a height lower than the height of the side cover 400 of the battery module 10. Here, the height may refer to the length of the third direction (Z-axis direction). In this case, the cross frame 22 may face or oppose the first extension portion 420 of the side cover 400 of the battery module 10 in the third direction (Z-axis direction). That is, the body 410 of the side cover 400 may face or oppose the cross frame 22 in the first direction (X-axis direction), and the first extension portion 420 protruding from the body 410 may face or oppose the cross frame 22 in the third direction (Z-axis direction). By this structure, the upper surface of the cross frame 22 may face or oppose the first extension portion 420 and may be used as a coupling region between the battery module 10 and the pack housing 20, and the side surface of the cross frame 22 may face or oppose the body 410 in the first direction and may support the side cover 400 in the first direction (X-axis direction).

The plurality of battery modules 10 may be coupled to one of the cross frames 22. For example, in two battery modules 10 opposing each other in the first direction (X-axis direction) with the cross frame 22 interposed therebetween, the side cover 400 of one of the battery modules 10 and the side cover 400 of the other battery module 10 facing the side cover may be coupled to the same cross frame 22. In this case, the first extension portion 420*s* of the side cover 400 may be disposed side by side in the first direction (X-axis direction).

The second extension portion 430 of the side cover 400 may be inclined with respect to the first extension portion 420. In this case, a predetermined distance may be formed between the second extension portion 430 and the body 410 of the side cover 400. The distance between the second extension portion 430 and the body 410 may be configured to gradually decrease in the third direction (positive Z-axis direction), which is a direction from the lower frame 21 of the pack housing 20 to the upper frame 23.

For example, in two battery modules 10 opposing each other in the first direction (X-axis direction), an dangle between the second extension portion 430 of one of the battery modules 10 and the second extension portion 430 of the other battery module 10 facing the same may form an acute angle.

A fastening member 30 may be used for coupling between the side cover 400 and the cross frame 22. In some implementations, the method of fastening the fastening member 30 and the structure (e.g., a first avoidance portion) for avoiding the fastening member 30 in the second extension portion 430 may be the same as what is described above with reference to FIGS. 1 to 4.

Also, the side cover 400 of the battery module 10 may have a structure for avoiding the coupling portion 24 of the pack housing 20 (e.g., the second avoidance portion or the third avoidance portion), and the features thereof may be the same as what is described above with reference to FIGS. 1 to 4.

The battery module 10 may not include a cover member covering the upper portion and a lower portion of the cell stack 100, by employing a side cover 400 structure having a reinforcement portion (e.g., the first extension portion 420 and the second extension portion 430}, battery module 10 may have structural rigidity equal to or greater than that of a general battery module. Also, since the battery module 10 does not have a lower cover, heat dissipation efficiency may also increase.

Also, using the battery module 10 and the battery pack 1 in the embodiments, a structure such as a housing having a specific size may not be provided, such that the manufacturing cost of the battery module 10 and the battery pack 1 may be reduced, and efficiency of the manufacturing process may increase.

Also, the first extension portion 420 and the second extension portion 430 protruding from the side cover 400 of the battery module 10 may firmly fix the pack housing 20 to the battery pack 1 and may also work as a reinforcing structure which may withstand expansion pressure of the battery cell 1000 effectively. Accordingly, the battery pack 1 having a relatively high degree of resistance against swelling pressure of the battery cell 1000 and having a simplified structure may be implemented.

In some embodiments, a battery module and battery pack that have a simplified structure and are able to sufficiently absorb expansion pressure of the battery cell may be implemented.

In addition, a battery pack having a structure in which the battery module may be firmly coupled to the pack housing may be implemented.

Furthermore, a battery module and a battery pack having relatively high energy density, relatively high heat dissipation efficiency and relatively strong resistance against swelling of a battery cell may be implemented.

The disclosed technology can be implemented in constructing battery modules or battery packs based on rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved battery modules or battery packs used in various power sources and power supplies, to mitigate climate changes in connection with uses of power sources and power supplies, and to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. A battery pack, comprising:

a plurality of battery modules, each battery module including: a cell stack that includes a plurality of battery cells arranged in a first direction; and a side cover disposed on at least one side of the cell stack;

a pack housing structured to accommodate the plurality of battery modules;

wherein the side cover in each battery module includes:

a body disposed at a side of the cell stack in the first direction;

a first extension portion extending from the body in the first direction; and a second extension portion connected to an upper end of the body and an end of the first extension portion, wherein the second extension portion includes an inclined surface with respect to the body or the first extension portion; and a fastening member configured to fasten the first extension portion to the pack housing, wherein the first extension portion includes a hole configured to allow the fastening member to penetrate, and the second extension portion includes a first avoidance portion including a groove structure formed on the inclined surface and configured to avoid interference with the fastening member, wherein the first extension portion has a structure that is perpendicular to the body and connects the body to the second extension portion, wherein the pack housing further includes:

an upper frame covering an upper portion of the plurality of battery modules;

a cross frame disposed to face the side cover of the plurality of battery modules; and a coupling portion disposed on the cross frame and coupled to the upper frame, wherein the second extension portion includes a second avoidance portion configured to avoid interference with the coupling portion, and the first extension portion includes a third avoidance portion configured to avoid interference with the coupling portion, wherein the third avoidance portion and the second avoidance portion overlap each other in a third direction corresponding to a height direction of the battery module, wherein the coupling portion penetrates a region where the third avoidance portion and the second avoidance portion overlap each other.

2. The battery pack of claim 1, wherein a spacing is formed between the second extension portion and the body.

3. The battery pack of claim 2, wherein the pack housing includes:

a lower frame structured to support the plurality of battery modules;

wherein the spacing between the second extension portion and the body tapers in a direction from the lower frame toward the upper frame.

4. The battery pack of claim 3, wherein the cell stack is disposed to face the upper frame and the lower frame in a state in which upper and lower portions of the plurality of battery cells are exposed.

5. The battery pack of claim 1, wherein the battery module further includes:

a busbar electrically connected to the plurality of battery cells in the cell stack; and an end cover disposed to face the busbar in a second direction perpendicular to the first direction.

6. The battery pack of claim 5, wherein the side cover is coupled to the end cover.

7. The battery pack of claim 1, wherein the side cover is coupled to the cross frame.

8. The battery pack of claim 1, wherein the body is disposed to face the cross frame in the first direction, and the first extension portion is disposed to face the cross frame in the third direction.

9. The battery pack of claim 8, wherein the fastening member is fastened to the cross frame.

* * * * *